(12) United States Patent
Nourollah

(10) Patent No.: US 10,926,682 B2
(45) Date of Patent: Feb. 23, 2021

(54) NON-SLIP VEHICLE SEAT COVERING

(71) Applicant: Day to Day Imports, Inc., Gardena, CA (US)

(72) Inventor: Akiva Nourollah, Gardena, CA (US)

(73) Assignee: Day to Day Imports, Inc., Gardena, CA (US)

( * ) Notice: Subject to any disclaimer, the term of this patent is extended or adjusted under 35 U.S.C. 154(b) by 0 days.

(21) Appl. No.: 16/402,939

(22) Filed: May 3, 2019

(65) Prior Publication Data

US 2019/0337430 A1 Nov. 7, 2019

Related U.S. Application Data

(60) Provisional application No. 62/666,414, filed on May 3, 2018.

(51) Int. Cl.
*B60N 2/60* (2006.01)

(52) U.S. Cl.
CPC .................. *B60N 2/6063* (2013.01)

(58) Field of Classification Search
CPC .................................. B60N 2/6063
See application file for complete search history.

(56) References Cited

U.S. PATENT DOCUMENTS

| 4,313,640 | A | 2/1982 | Trotman et al. |
| 4,676,376 | A | 6/1987 | Keiswetter |
| 5,806,925 | A | 9/1998 | Hanley |
| 6,648,410 | B2 | 11/2003 | Sparks |
| 7,172,246 | B1 | 2/2007 | Itakura |
| 7,374,240 | B2 | 5/2008 | Gold et al. |
| 7,819,484 | B2 | 10/2010 | Conforti |
| 7,878,588 | B2 | 2/2011 | Snedeker |
| D638,648 | S | 5/2011 | Carlomusto |
| 8,882,557 | B2 | 11/2014 | Fair et al. |
| 9,155,974 | B2 | 10/2015 | Fair et al. |
| 9,603,462 | B2 | 3/2017 | Markowitz |
| D782,848 | S | 4/2017 | Fernandez |
| D787,863 | S | 5/2017 | Feeken et al. |
| 2002/0185898 | A1 | 12/2002 | Smith |
| 2007/0170757 | A1 | 7/2007 | Lanham et al. |
| 2014/0306499 | A1* | 10/2014 | Wright ................. G09F 21/045 297/223 X |
| 2015/0197172 | A1 | 7/2015 | Durnil |
| 2017/0253159 | A1* | 9/2017 | Lopatin ................ B60N 2/6063 |

FOREIGN PATENT DOCUMENTS

DE 20 2010 017433 U1 11/2011
WO 2008000011 A1 1/2008

\* cited by examiner

*Primary Examiner* — Anthony D Barfield
(74) *Attorney, Agent, or Firm* — Hall Estill Attorneys at Law; Mitchell K. McCarthy

(57) ABSTRACT

An apparatus and associated methodology contemplating a non-slip cover apparatus for a vehicle seat. The non-slip cover has a front fabric panel having an exposed outer surface in operable contact with the user and an inner surface having an elastomeric member in operable contact with the vehicle seat. A rear fabric panel is sewn to the front fabric panel forming a cavity therebetween to receivingly engage the vehicle seat in a close mating relationship.

20 Claims, 8 Drawing Sheets

NON-SLIP VEHICLE SEAT COVERING

RELATED APPLICATION

This application claims the benefit of the earlier-filed provisional patent application, Ser. No. 62/666,414, filed on May 3, 2018.

BACKGROUND

A variety of different types of vehicle seat covers are commercially available for users who want to permanently cover the upholstery on the seats in their vehicle. Options at the top end of the price scale are custom-fit seat covers that are tailor-made to closely conforming dimensions matching the size and shape of the vehicle's make and model. Typically, those seat cover designs employ multiple coverings for each of the seat's cushion, backrest, and headrest. Alternatively, unitarily constructed options can be found for some vehicles. Fastener devices, such as zippers, straps, and drawstrings, are used to secure these coverings to the respective seat portions.

More economical universal-fit seat covers are also available, designed to cover a range of differently-shaped vehicle seats. However, the advantages of lower price often come at the cost of a less-than-desirable fit, in comparison to the fit and feel of a custom-fit cover. Because a particular universal-fit cover accommodates a variety of differently-shaped vehicle seats, the fit can result in loose material that slides around and bunches together under use. What is needed are improvements in the fit and feel of a universal-fit cover to more approximate the fit and feel of the custom-fit alternative, without the higher-price penalty. It is to those improvements that embodiments of this technology are directed.

SUMMARY

Some embodiments of this technology contemplate a non-slip cover apparatus for a vehicle seat. The non-slip cover has a front fabric panel having an exposed outer surface in operable contact with the user and an inner surface having an elastomeric member in operable contact with the vehicle seat. A rear fabric panel is sewn to the front fabric panel forming a cavity therebetween to receivingly engage the vehicle seat in a close mating relationship.

Some embodiments of this technology contemplate a method for covering a vehicle seat, including the steps of: obtaining a non-slip cover having a front fabric panel with an exposed outer surface and an inner surface having an elastomeric member, and the cover having a rear fabric panel sewn to the front fabric panel forming a cavity therebetween; and inserting the vehicle seat into the cavity so that the elastomeric member contacts against the vehicle seat.

Some embodiments of this technology contemplate a cover for a vehicle seat, with a front fabric panel having an exposed outer surface in operable contact with the user and an inner surface adjacent the vehicle seat, with a rear fabric panel sewn to the front fabric panel forming a cavity therebetween to receivingly engage the vehicle seat in a close mating relationship, and with means for frictionally securing the inner surface against the vehicle seat.

Some embodiments of this technology contemplate a non-slip cover apparatus for a vehicle seat. The apparatus has a synthetic polymer front fabric panel having an exposed outer surface in operable contact with the user, an inner surface having an elastomeric member in operable contact with the vehicle seat, and a spacer-layer fabric sandwiched between the outer and inner surfaces. A resilient rear fabric panel is sewn to the front fabric panel, forming a cavity therebetween to receivingly engage the vehicle seat in a close mating relationship.

BRIEF DESCRIPTION OF THE DRAWINGS

Details of various embodiments of the present technology are described in connection with the accompanying drawings that bear similar reference numerals.

DESCRIPTION

Initially, this disclosure is by way of example only, not by limitation. The illustrative constructions and associated methods disclosed herein are not limited to use or application for any specific system or in any specific environment. That is, the disclosed technology is not limited to usage for constructing the illustrative embodiments. Thus, although the instrumentalities described herein are for the convenience of explanation, shown and described with respect to exemplary embodiments, the skilled artisan understands that the principles herein may be applied equally in various types of seat and other such support structures.

Figure 1:
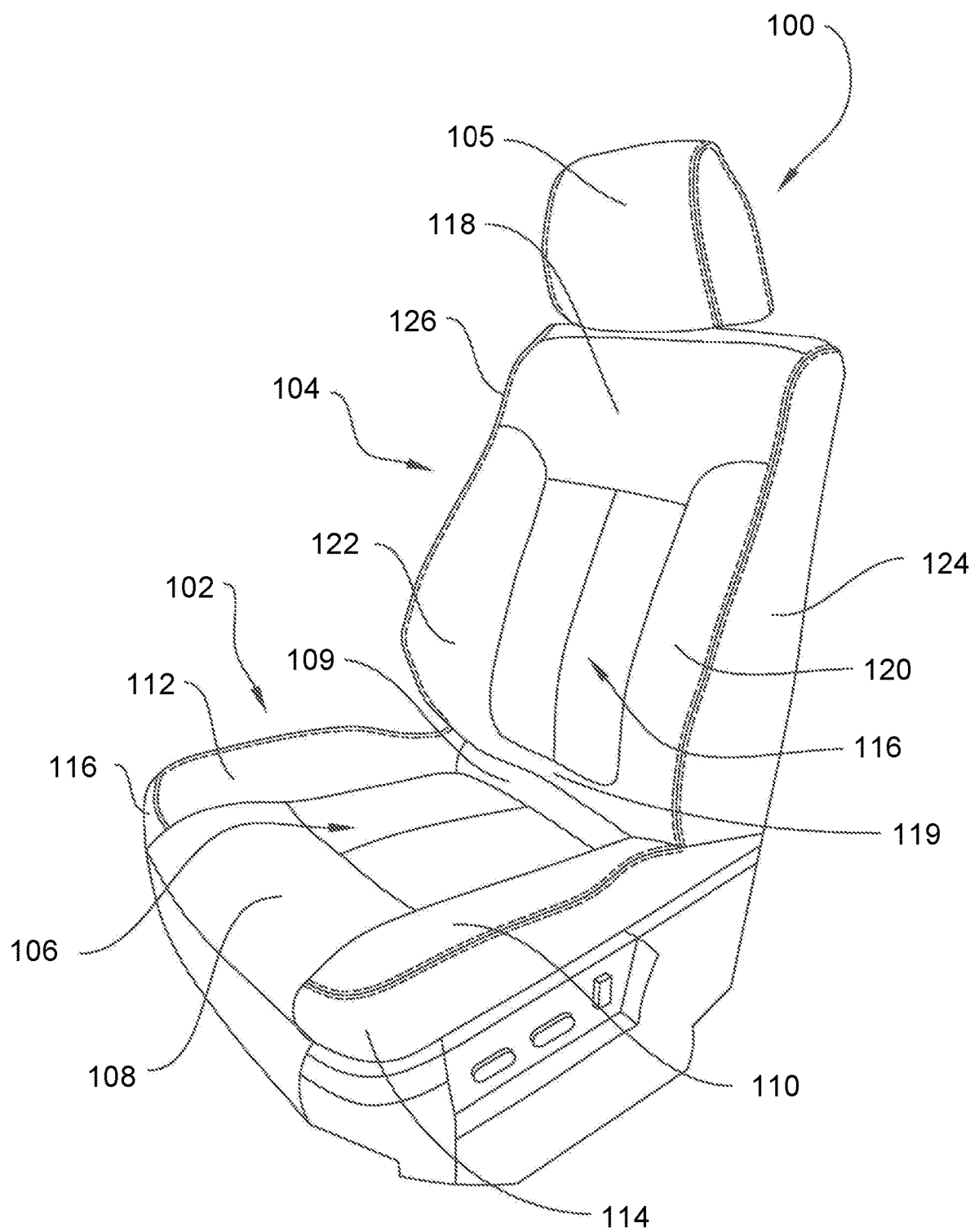
FIG. 1 is a front-side isometric depiction of a vehicle seat that is suited for using the present seat covering technology.

FIG. 1 depicts a driver's-side front seat 100 in a Ford F-150 truck vehicle. As is customary in the upholstery arts, the seat 100 has a cushion 102 joined to a backrest 104, with a headrest 105 extending upwardly from the backrest 104. The cushion 102 upholstery has a characteristic top plate that is formed by joining a centrally-located insert 106 to opposing central collars 108, 109 and to opposing side collars 110, 112. Boxing components 114, 116 are joined to the collars 108, 109, 110, 112 to complete the cushion 102.

The backrest 104 upholstery similarly has a characteristic front plate that is formed by an insert 116 bordered by opposing central collars 118, 119 and opposing side collars 120, 122. The collars 118, 119, 120, 122 are joined to boxing components 124, 126 that are, in turn, joined to a rear plate (FIG. 3) of the backrest 104.

Figure 2:
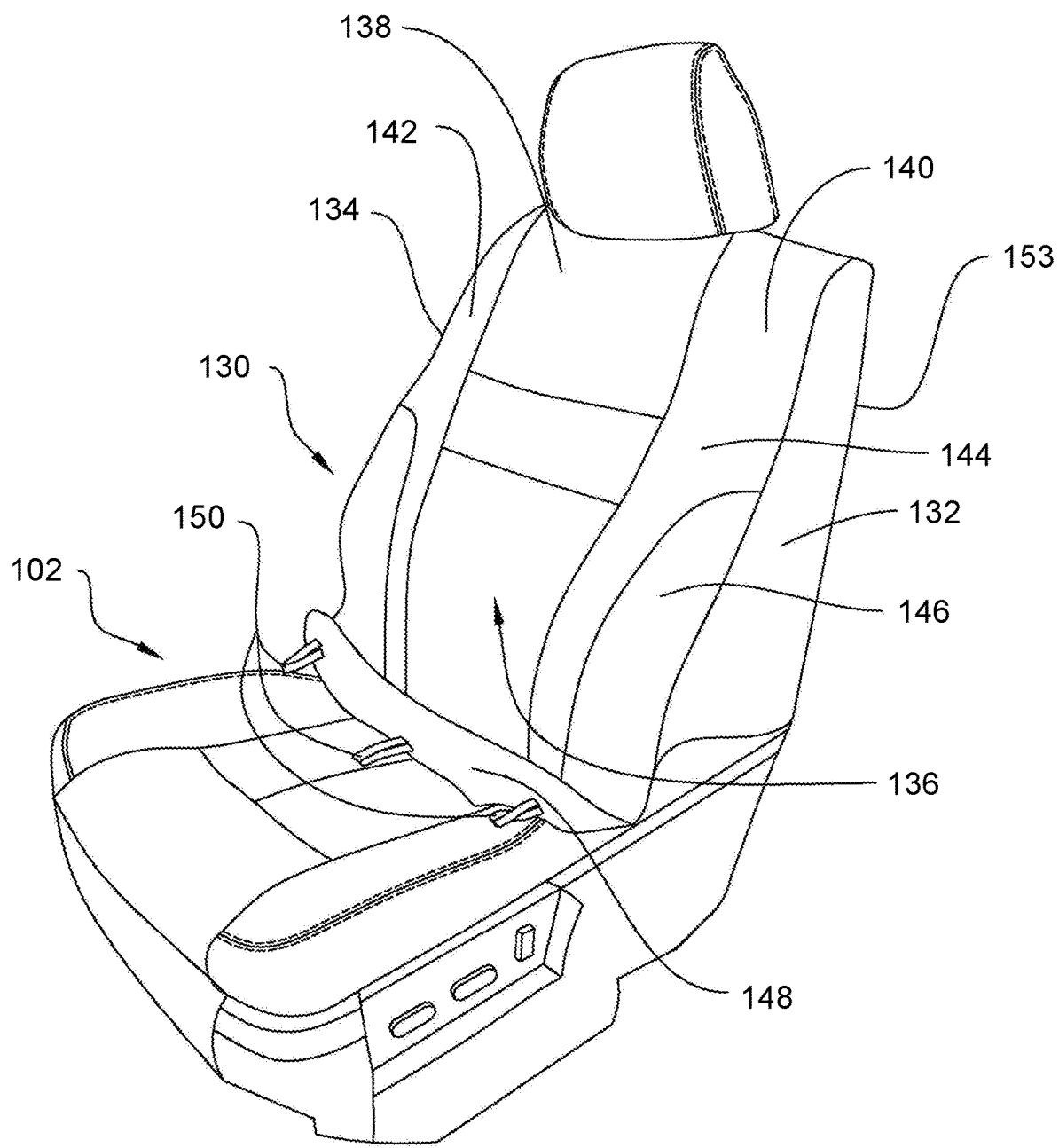
FIG. 2 depicts the same as FIG. 1 except that a backrest cover that is constructed in accordance with illustrative embodiments of this technology is operably installed over the backrest of the seat of FIG. 1.

FIG. 2 is the same perspective as FIG. 1, but depicting a backrest cover 130 that is constructed in accordance with this technology having been placed on the backrest 104. The backrest cover 130 of these illustrative embodiments is generally constructed of a multiple-layered front fabric panel joined to single-layer side and rear fabric panels. The front fabric panel is constructed to meet the typical user requirements of vehicle upholstery, namely a luxurious appearance, a plush, comfortable feel, durability and resilience. The side and rear fabric panels serve to secure the front panel in place, covering the rest of the backrest 104 for a consistent, aesthetically-pleasing look. Altogether, the front, side, and rear fabric panels form an internal cavity (FIG. 5) that is sized to receivingly engage the backrest 104 in a close mating relationship. Although discrete side fabric panels 132, 134 are disclosed in these illustrative construction embodiments, the contemplated embodiments are not so limited. In equivalent alternative embodiments, for example, front and rear fabric panels can be sewn or otherwise joined directly together to form the close-fitting internal cavity. An enumeration of all possible ways of joining the front and rear fabric panels together to form the close-mating internal cavity is unnecessary for the skilled artisan to understand the scope of the claimed subject matter.

In these illustrative embodiments, the front fabric panel generally includes an insert 136 bordered by a central collar 138 and opposing side collars 140, 142. Each of the side collars 140, 142 can be a decorative two-piece construction as depicted, the larger top piece 144 and smaller bottom piece 146 sewn together with a reinforcing double top stitch seam, which is curved to provide an aesthetically-pleasing flair. A tab 148 at the bottom-end of the front fabric panel spans the collars 140, 142 and the insert 136 therebetween. In FIG. 2, the tab 148 is shown laying on the cushion 102. A number of elastic loops 150 extend from the tab 148. The final installation of the backrest cover 130 in these illustrative embodiments includes passing the tab 148 and loops 150 through the crack-opening between the cushion 102 and the backrest 104, then securing the loops 150 to suitable portions of the underlying seat framework (not depicted) to make the tab 148 taut and secure.

Figure 3:
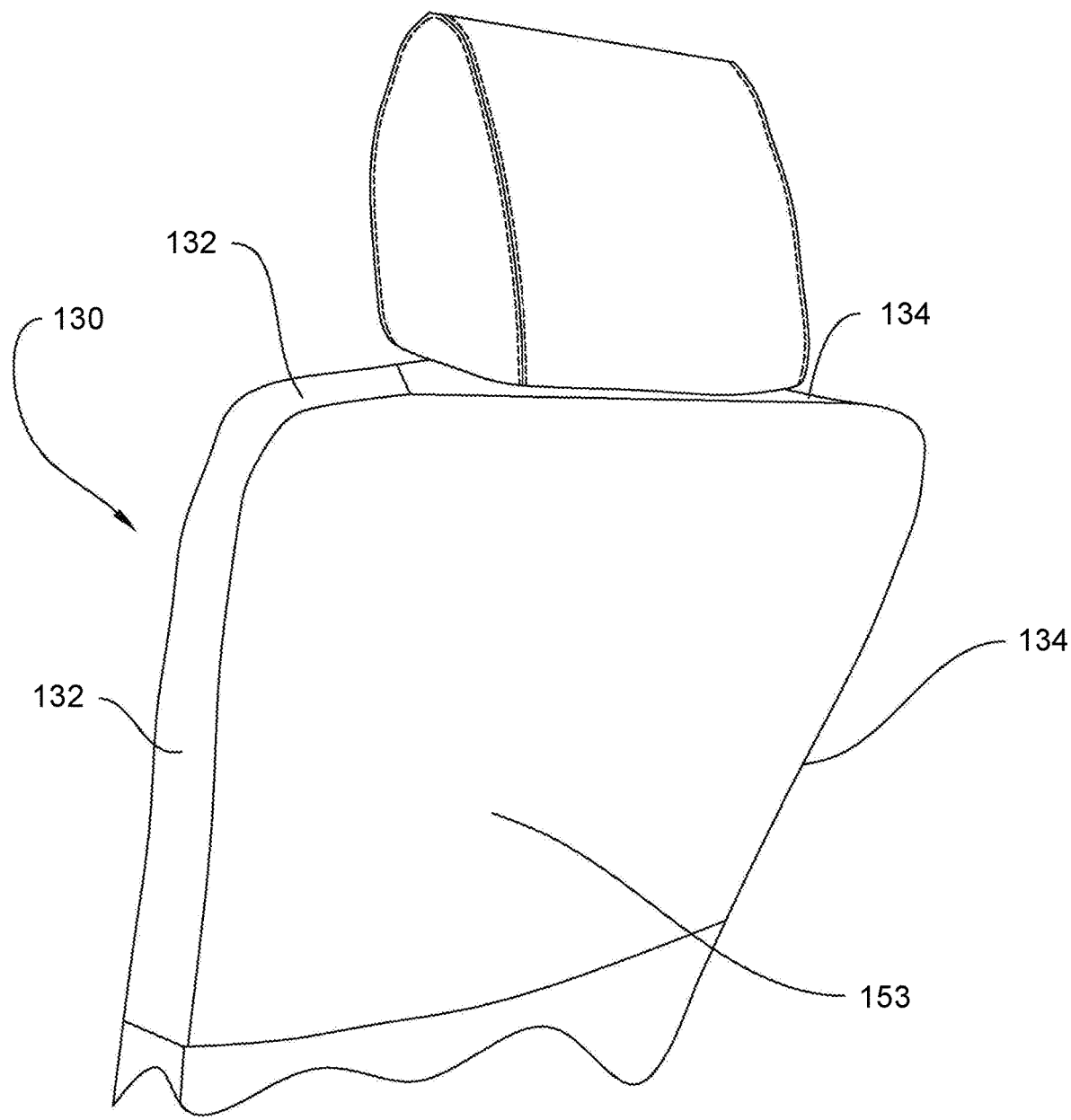
FIG. 3 is a rear-side isometric depiction of the backrest cover of FIG. 2.
Figure 4:
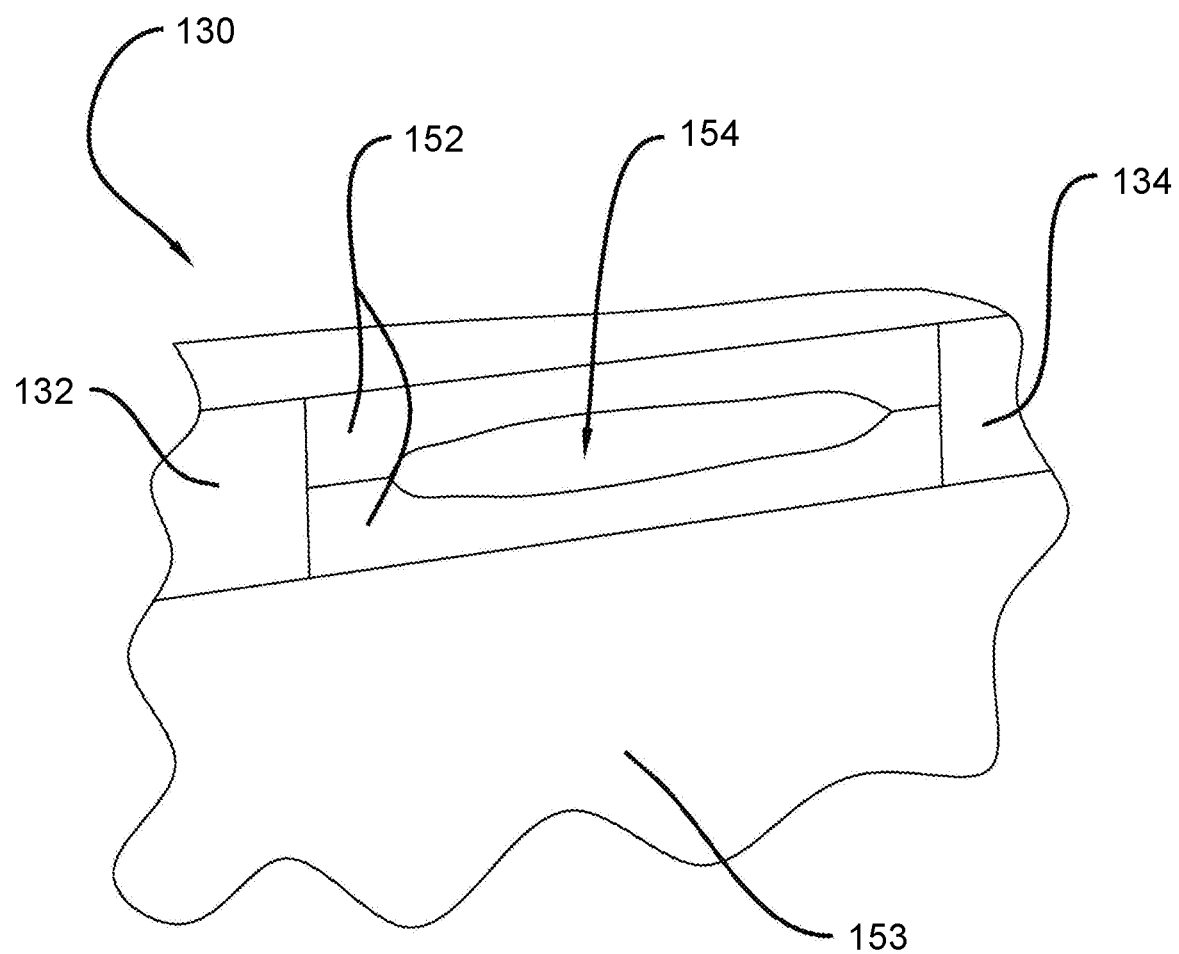
FIG. 4 depicts the top-side of the backrest cover of FIG. 3 with the headrest removed from the vehicle seat.

FIG. 3 is a rear isometric depiction of the backrest cover 130 of FIG. 2. The rear fabric panel in these illustrative embodiments is a simple, unadorned, cover 153, attached to the fabric side panels 132, 134 and spanning the area therebetween. The side and rear fabric panels 132, 134, 153 can be advantageously constructed of a lightweight and resilient material, such as a nylon knit material with spandex or elastane content, such as Lycra®. FIG. 4 depicts the top-end of the backrest cover 130 with the headrest 105 omitted to reveal top-side fabric panels 152 attached to and spanning between the side panels 132, 134, forming a clearance opening 154 through which supporting structure of the headrest 105 passes. The fabric edges forming the opening 154, and the fabric edge at the lower end of the cover 153, are preferably bunched together and sewn to elastic to accommodate stretching the backrest cover 130 over the seat's backrest 104.

Figure 5:
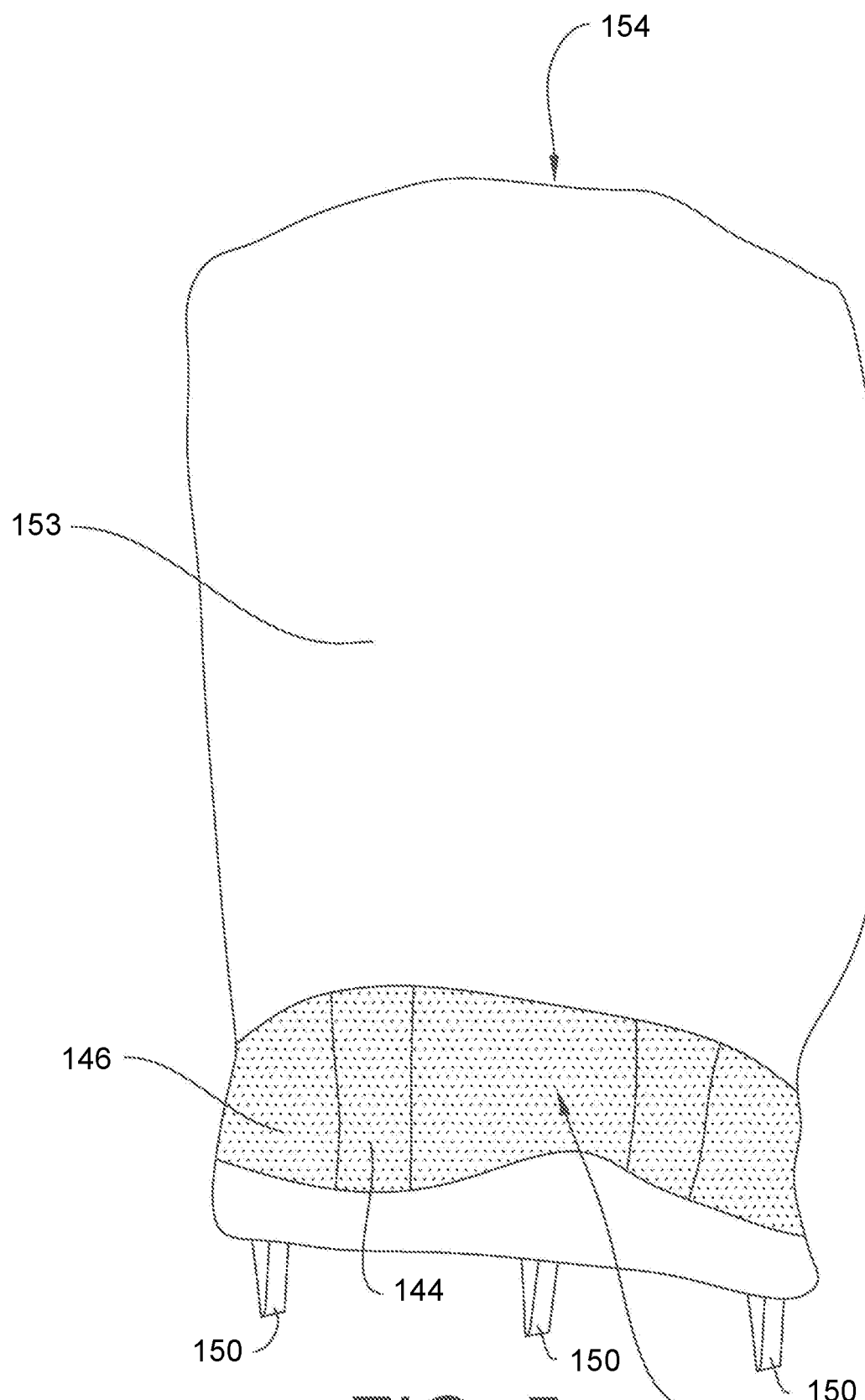
FIG. 5 is a rear-elevational depiction of the backrest cover of FIG. 2 removed from the vehicle seat.

FIG. 5 is a rear-elevational depiction of the backrest cover 130. Note that the front fabric panel extends below the bottom of the rear fabric panel 153, revealing the inside-surfaces of the front fabric panel's insert 136, collar pieces 144, 146, and tab 148. These inside-surfaces operably contact directly against the front plate of the seat's backrest 104. The embodiments of this technology generally provide for increasing the frictional resistance of these inside-surfaces to reduce, if not eliminate, slippage of the backrest cover 130 on the underlying backrest 104.

Figure 6:
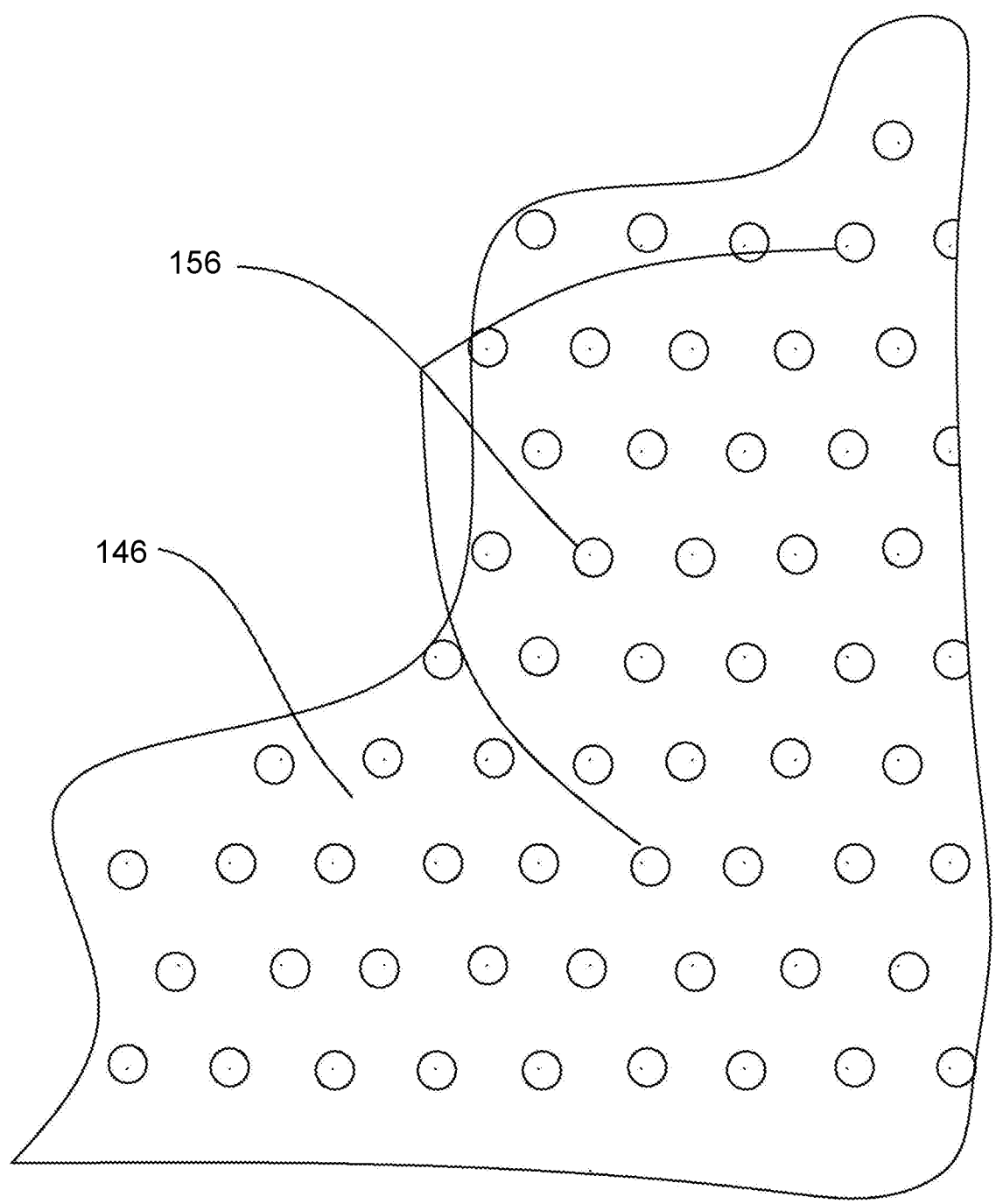
FIG. 6 is an enlarged depiction of a portion of the backrest cover of FIG. 5, particularly depicting an array of elastomeric protuberances on the inside-surface that operably contacts against the vehicle seat.

FIG. 6 is an enlarged portion of FIG. 5, more particularly depicting the inside-surface of the collar piece 146, having applied to it an array of dot-shaped elastomeric members 156. These elastomeric members 156 can generally be constructed of friction-increasing materials such as, but not limited to, nylon, natural and synthetic rubbers, adhesives, silicone, thermoplastics, and various other polymers and the like. They serve the purpose of operably contacting against the underlying backrest 104 to generally increase the frictional engagement of the backrest cover 130 against the backrest 104, thereby advantageously preventing the backrest cover 130 from slipping on the backrest 104. This provides improved comfort to the user, in that the non-slip construction prevents the user's body movements from otherwise causing the backrest covering to slip and displace, even bunch up and wrinkle, making it unsightly and feel uncomfortable to the user.

In these illustrative embodiments, a widespread and uniformly-distributed array of protuberant dot-shaped elastomeric members 156 is provided, but the contemplated embodiments are not so limited. In alternative embodiments, an array of differently-shaped elastomeric members can be employed, uniformly distributed or not, as well as enlarged and/or elongated shapes of the elastomeric material can be applied in areas where extra retention might be desirable.

Figure 7:
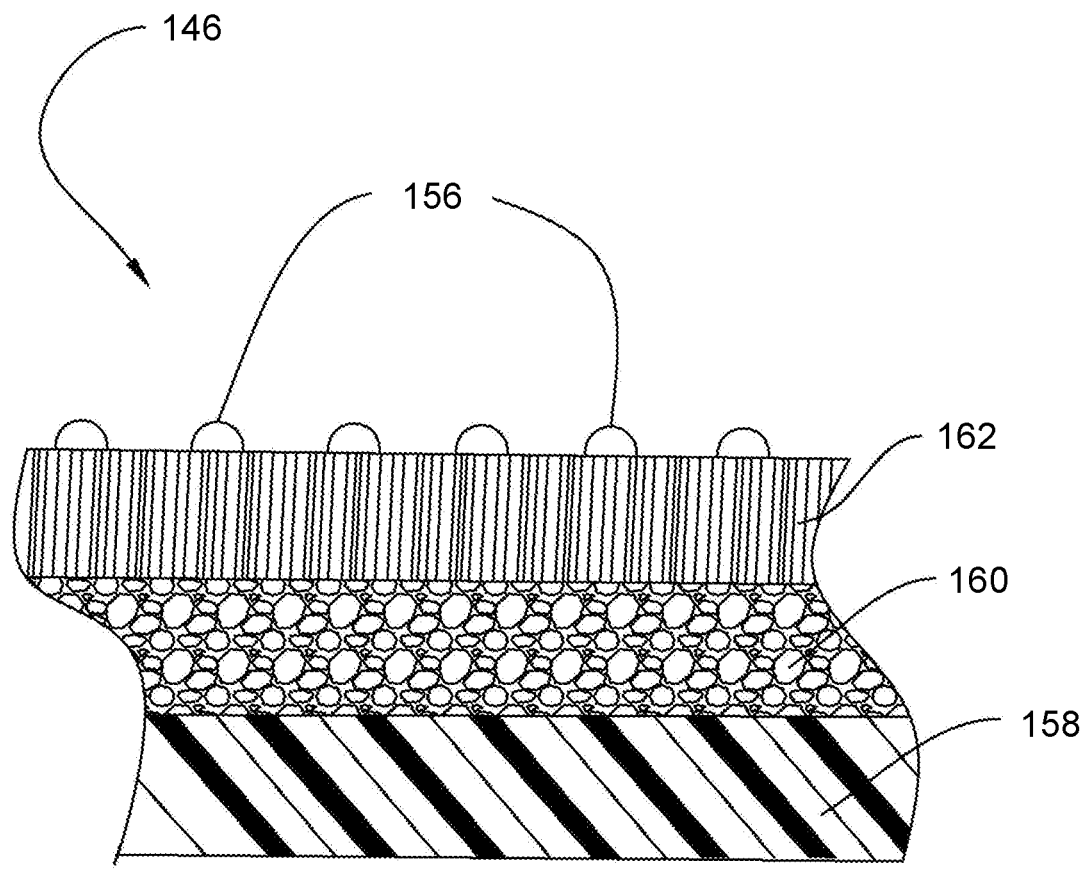
FIG. 7 is a diagrammatic cross-sectional depiction of the fabric material used in constructing the front plate of the backrest cover of FIG. 2 in accordance with illustrative embodiments of this technology.

FIG. 7 is a diagrammatic cross-sectional depiction of the layered fabric material used to construct all the pieces making up the front fabric panel of the backrest cover 130, including the collar piece 146, in accordance with illustrative embodiments of this technology. An outer neoprene layer 158 can be constructed of open-cell, closed-cell, or foamed material. A foam layer 160 can be adhered to the neoprene layer 158 to provide a plusher feel to the user. A spacer layer fabric 162, such as a warp knit spacer fabric, can be adhered or otherwise joined to the neoprene/foam layers for added substance and comfort. The knitted spacer fabric is generally constructed by knitting two fabric layers together that are spatially separated by a connecting layer, such as can be produced with a two needle-bed Raschel machine. The elastomeric protuberances 156 are applied to the inside-surface of the spacer layer fabric 162 in these illustrative embodiments.

Figure 8:
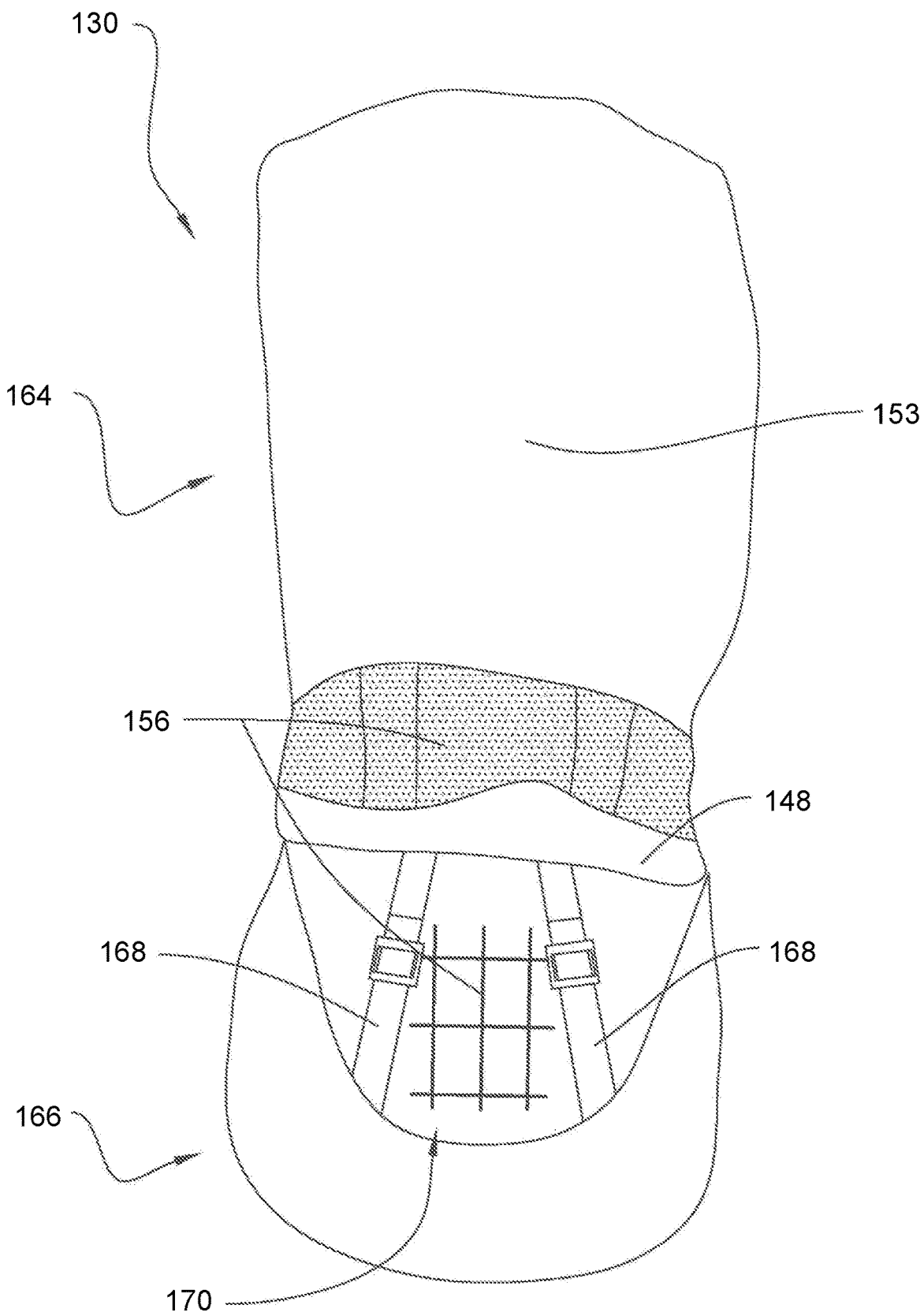
FIG. 8 is a rear elevational depiction of a unitarily constructed seat cover that is constructed in accordance with alternative embodiments of this technology.

In these illustrative embodiments, the backrest cover 130 is used to cover the seat's backrest 104 and a similarly-constructed cushion cover (not depicted) is used to cover the seat's cushion 102. Further, a similarly-constructed headrest cover (not depicted) can be used to cover the seat's headrest 105. Alternatively, all three of those covers can be unitarily constructed into just one cover for covering the entire seat 102. FIG. 8 depicts the bottom and rear sides of such a unitarily-constructed, all-encompassing seat cover 164 for both the cushion 102 and the backrest 104 in accordance with illustrative embodiments. Here, a cushion cover 166, constructed like the backrest cover 130 but closely-conforming to the seat cushion 102, is attached to the distal end of the tab 148 portion of the backrest cover 130 described above. Instead of the attaching loops 150, securing straps 168 have opposing ends connected to the bottom-side of the cushion cover 166 and to the tab 148. After placing the backrest cover 130 and the cushion cover 166 over the backrest 104 and the cushion 102, respectively, the straps 168 are closed and drawn tight to secure the seat cover 164 onto the entire vehicle seat. In addition to stippling the elastomeric dots 156 to the inside-surface as described above, FIG. 8 also depicts how horizontal and vertical elongated protuberant portions of the elastomeric material 170 can be applied to the inside-surface to reduce, if not eliminate, slipping between the seat cover 164 and the vehicle seat.

Generally, embodiments of this technology contemplate a non-slip seat cover having a front fabric panel with an exposed outer surface in operable contact with the user and an inner surface adjacent the vehicle seat, a rear panel sewn to the front fabric panel forming a cavity therebetween to receivingly engage the vehicle seat in a close mating relationship, and means for frictionally securing the inner surface against the vehicle seat. For purposes of this description and meaning of the appended claims, the term "means for frictionally securing" encompasses directly attaching the elastomeric materials to the inner surface that is in operable contact against the underlying seat cushion and/or backrest. "Means for frictionally securing" expressly excludes previously attempted solutions of applying separate adhesives and the like between a seat cover and the underlying seat. The present technology resolves inherent deficiencies of those previously attempted solutions by making the elastomeric materials firmly rooted on the inner surface of the seat cover so that it cannot become separated from it under any condition.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

What is claimed:

1. A non-slip cover apparatus for a vehicle seat, comprising:
    a front fabric panel having an exposed outer surface in operable contact with the user and an inner surface having attached thereto an elastomeric protuberance in operable contact against the vehicle seat; and
    a rear fabric panel attached to the front fabric panel forming a cavity therebetween to receivingly engage the vehicle seat in a close mating relationship.

2. The apparatus of claim 1 wherein the inner surface is stippled with a plurality of the elastomeric protuberances.

3. The apparatus of claim 2 wherein the elastomeric protuberances form a substantially uniformly distributed pattern on the inner surface.

4. The apparatus of claim 3 wherein the elastomeric protuberances form an array of substantially round dots on the inner surface.

5. The apparatus of claim 3 wherein the elastomeric protuberances form elongated protuberances.

6. The apparatus of claim 1 wherein the elastomeric protuberance comprises a constituent selected from the group consisting of rubber, silicone, nylon, and polyurethane.

7. The apparatus of claim 1 comprising a strap connected to at least one of the front and rear panels and configured for securing the respective panel to the vehicle seat.

8. The apparatus of claim 7 wherein the strap comprises an elastic loop.

9. The apparatus of claim 1 wherein the front fabric panel comprises a neoprene material.

10. The apparatus of claim 1 wherein the front fabric panel comprises a spacer fabric material.

11. The apparatus of claim 1 wherein the front fabric panel comprises a neoprene material layer joined to a spacer fabric material layer.

12. The apparatus of claim 11 wherein the spacer fabric material layer comprises a warp knitted spacer fabric material.

13. The apparatus of claim 1 wherein the rear fabric panel comprises a nylon knit material.

14. The apparatus of claim 13 wherein the rear fabric panel comprises an elastomeric constituent.

15. The apparatus of claim 14 wherein the rear fabric panel comprises spandex.

16. The apparatus of claim 1 wherein the front and rear fabric panels are sewn together to form an opening configured for passing a headrest portion of the vehicle seat therethrough.

17. The apparatus of claim 1 comprising a unitarily-constructed cover having a seat cushion cover portion and a seat backrest cover portion.

18. A method for covering a vehicle seat, comprising:
    obtaining a non-slip cover having a front fabric panel with an exposed outer surface and an inner surface having attached thereto a patterned plurality of elastomeric protuberance members, and the cover having a rear fabric panel attached to the front fabric panel forming a cavity therebetween; and
    inserting the vehicle seat into the cavity so that the patterned plurality of elastomeric protuberance members contact against the vehicle seat.

19. A cover for a vehicle seat, comprising:
    a front fabric panel having an exposed outer surface in operable contact with the user and an inner surface having attached thereto a patterned plurality of elastomeric protuberance members in operable contact against the vehicle seat; and
    a rear fabric panel attached to the front fabric panel forming a cavity therebetween to receivingly engage the vehicle seat in a close mating relationship.

20. A non-slip cover apparatus for a vehicle seat, comprising:
    a synthetic polymer front fabric panel having an exposed outermost surface in operable contact with the user;
    an innermost inner surface having attached thereto a patterned plurality of elastomeric protuberance members in operable contact with the vehicle seat and
    a spacer-layer fabric sandwiched between the outermost and innermost surfaces; and
    a resilient rear fabric panel attached to the front fabric panel forming a cavity therebetween to receivingly engage the vehicle seat in a close mating relationship.

* * * * *